United States Patent Office 3,709,897
Patented Jan. 9, 1973

3,709,897
2-ARYL-4,4-DIALKYL-5-HALOMETHYLENE-
OXAZOLINES
Patrick J. McNulty, Wyndmoor, Colin Swithenbank,
Perkasie, Kenneth L. Viste, Warminster, and William
C. von Meyer, Willow Grove, Pa., assignors to Rohm &
Haas Company, Philadelphia, Pa.
No Drawing. Continuation-in-part of application Ser. No.
829,084, May 29, 1969. This application Apr. 19, 1971,
Ser. No. 135,450
Int. Cl. C07d 85/36
U.S. Cl. 260—307 F          10 Claims

ABSTRACT OF THE DISCLOSURE

Compounds belonging to the class of 2-(mono, di or tri-substituted phenyl) - 4,4-dialkyl-5-halomethylene-oxazolines and their salts. They are selective herbicides and fungicides.

---

This application is a continuation-in-part of U.S. Ser. No. 829,084, filed May 29, 1969, now Pat. No. 3,661,991.

This invention is concerned with novel compounds belonging to the class of N-(1,1-dialkyl-3-chloroacetonyl)-3-(or -3,4-, -3,5- or -3,4,5-) substituted benzamides. Their structure may be represented by the formula

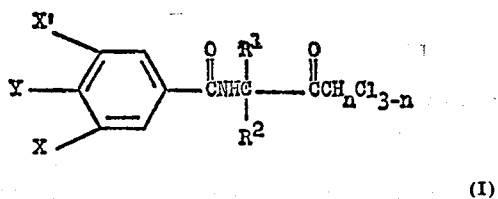

(I)

wherein

X and X' are selected from the group consisting of hydrogen, bromo, chloro, fluoro, methyl, ethyl and trifluoromethyl groups with the proviso that only one of X and X' may be hydrogen;

Y is hydrogen, bromo, chloro, fluoro or methyl;

$R^1$ and $R^2$ are individually selected from the group consisting of methyl and ethyl; and $n$ is an integer from 0 to 2 inclusive.

At times these compounds will hereinafter be referred to as N-(1,1-dialkyl-3-chloroacetonyl)benzamides.

The novel compounds of this invention provide a new class of selective herbicides. They are effective at low dosage rates and are particularly active by preemergence-type application. Many of the major economic crops are tolerant to them. These compounds also possess fungicidal activity, particularly against Phycomycetes.

Somewhat related structures are known in the literature. Gabriel, Berichte 46, 1319 (1913) reported the preparation of $C_6H_5CONHC(CH_3)_2COCH_3$ by hydrolysis of the corresponding tetramic acid ester. These compounds are not known to be biological toxicants.

The novel N-(1,1-dialkyl - 3 - chloroacetonyl) benzamides are of three types, monochloro (Formula II), dichloro (Formula III) and trichloro (Formula IV):

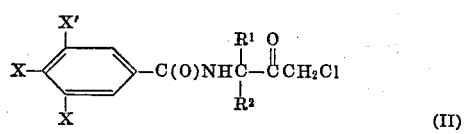

(II)

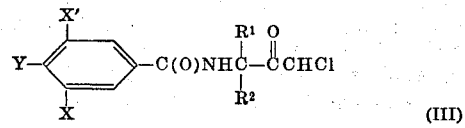

(III)

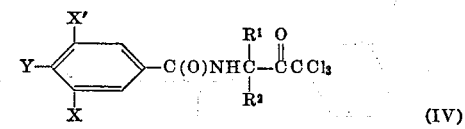

(IV)

Typical compounds within the scope of Formula I include the following:

N-(1,1-dimethyl-3-chloroacetonyl)-3-chlorobenzamide
N-(1,1-diethyl-3-chloroacetonyl)-3-chlorobenzamide
N-(1,1-dimethyl-3-chloroacetonyl)-3,5-dichlorobenzamide
N-(1,1-dimethyl-3-chloroacetonyl)-3-bromo-5-chlorobenzamide
N-(1,1-dimethyl-3-chloroacetonyl)-3-chloro-5-methylbenzamide
N-(1,1-dimethyl-3-chloroacetonyl)-3-fluoro-5-methylbenzamide
N-(1,1-dimethyl-3-chloroacetonyl)-3-ethyl-5-methylbenzamide
N-(1,1-dimethyl-3-chloroacetonyl)-3-chloro-4-methylbenzamide
N-(1,1-dimethyl-3-chloroacetonyl)-3,4,5-trichlorobenzamide
N-(1,1-dimethyl-3-chloroacetonyl)-3,5-dichloro-4-methylbenzamide
N-(1,1-dimethyl-3-chloroacetonyl)-3,5-dibromo-4-chlorobenzamide
N-(1,1-dimethyl-3,3-dichloroacetonyl)-3-chlorobenzamide
N-(1,1-dimethyl-3,3-dichloroacetonyl)-3-ethylbenzamide
N-(1,1-dimethyl-3,3-dichloroacetonyl)-3-fluorobenzamide
N-(1,1-dimethyl-3,3-dichloroacetonyl)-3-methylbenzamide
N-(1,1-dimethyl-3,3-dichloroacetonyl)-3-chloro-4-methylbenzamide
N-(1,1-dimethyl-3,3-dichloroacetonyl)-3,5-dimethylbenzamide
N-(1,1-dimethyl-3,3-dichloroacetonyl)-3,4,5-trichlorobenzamide
N-(1,1-dimethyl-3,3-dichloroacetonyl)-3,5-dichloro-4-methylbenzamide
N-(1,1-dimethyl-3,3-dichloroacetonyl)-3,5-dichloro-4-bromobenzamide
N-(1,1-dimethyl-3,3,3-trichloroacetonyl)-3-chlorobenzamide
N-(1,1-dimethyl-3,3,3-trichloroacetonyl)-3-methylbenzamide
N-(1,1-dimethyl-3,3,3-trichloroacetonyl)-3-bromobenzamide
N-(1,1-dimethyl-3,3,3-trichloroacetonyl)-3-trifluoromethylbenzamide
N-(1,1-dimethyl-3,3,3-trichloroacetonyl)-3-chloro-4-methylbenzamide
N-(1,1-dimethyl-3,3,3-trichloroacetonyl)-3,5-dimethylbenzamide
N-(1,1-dimethyl-3,3,3-trichloroacetonyl)-3-chloro-5-fluorobenzamide
N-(1,1-dimethyl-3,3,3-trichloroacetonyl)-3,4,5-trichlorobenzamide
N-(1,1-dimethyl-3,3,3-trichloroacetonyl)-3,5-dichloro-4-methylbenzamide
N-(1,1-dimethyl-3,3,3-trichloroacetonyl)-3,4,5-trimethylbenzamide The novel N-(1,1-dialkyl-3-chloroacetonyl) benzamides of Formula II may be prepared by the chlorination of the corresponding N-(1,1-dialkyl - 2 - propynyl) benzamide (Formula V), which produces a 2-phenyl-4,4-dialkyl-5-chloromethylene-oxazoline (Formula VI), usually as the hydrochloride, and this is then hydrolyzed to the N-(1,1-dialkyl-3-chloroacetonyl) benzamide (Formula II). The following equation depicts this reaction:

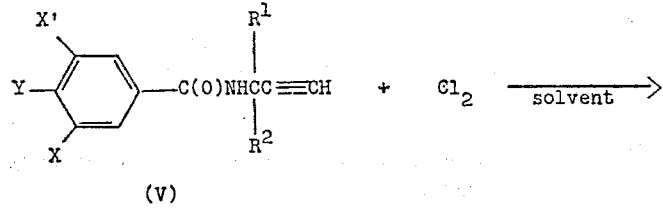

(V)

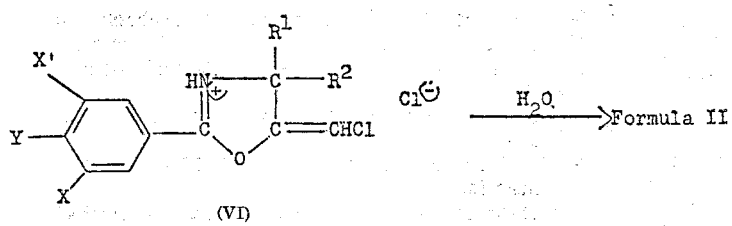

(VI)

Compounds of the type of Formula V are known in the literature. They may be prepared by the reaction of a benzoyl chloride with the appropriate propargyl amine in the presence of an acid acceptor in accordance with the following equation

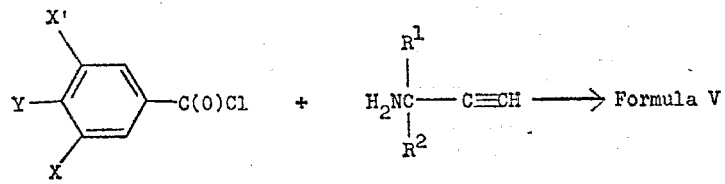

This amidation reaction is conveniently carried out in the presence of an inert organic solvent in the temperature range of 0 to 50° C.

When a compound of Formula II is desired, the chlorination of a compound of Formula V is carried out in the presence of a solvent in which the starting benzamide (Formula V) is substantially soluble, but in which the oxazoline hydrochloride of Formula VI is essentially insoluble. In this manner the oxazoline hydrochloride is removed from the sphere of the reaction and over-chlorination is avoided. Otherwise compounds of Formula VII result. Suitable solvents for this reaction include ethers, such as ethyl ether and dioxane; chlorinated solvents, such as ethylene dichloride; and esters such as ethyl acetate. In preparing the monochloroacetonyl derivatives (Formula II) the use of an excess of chlorine is to be avoided. Other chlorinating agents, such as N-chlorosuccinimide and sulfuryl chloride, may be used, but chlorine is preferred. A catalyst such as phosphorus trichloride sometimes aids the reaction. The chlorination reaction may be run in the temperature range of —50° to 250° C., preferably 0°–100° C. In cases where the nitrogen atom of the oxazoline ring is highly sterically hindered, the hydrochloride of the oxazoline does not precipitate and care must be taken to avoid overchlorination. In these cases the chloromethylene oxazoline (the free base of a Formula VI compound) is isolated upon removal of the solvent.

It should be noted that the stereochemistry of the hydrogen and chlorine substituents on the exocyclic 5-methylene group of Formula VI compounds has not been determined, but a single isomer is indicated by the sharpness of the n.m.r. spectra. Previous reports on the stereochemistry of additions to acetylenes have shown that a prediction would be dangerous, e.g. see Fahey and Lee, J. Am. Chem. Soc. 88, 5555 (1966) and references cited therein.

The hydrolysis of compounds of Formula VI is readily carried out with water using a water-miscible solvent, such as an alcohol, e.g. ethanol, dioxane or acetic acid, preferably with acidic catalysts. If desired, a mineral acid such as hydrochloric or sulfuric acid, may be used to facilitate the reaction. The hydrolysis may be run in the temperature range of room temperature to reflux. The hydrolysis times will vary from a few minutes to several days depending upon the oxazoline hydrochloride being hydrolyzed, the temperature of hydrolysis and the solvent. Optimum conditions vary for the specific hydrolysis to be undertaken. It is desirable to avoid conditions which would give hydrolysis at the amide linkage of the desired benzamide into its component parts. One convenient method for isolating the benzamides of Formula II is to add water to the reaction mixture in such an amount to just start precipitation and to allow the product to crystallize out. In this manner products requiring no further purification are often isolated.

Goodman and Winstein, J. Am. Chem. Soc. 79, 4789 (1957) have reported on the hydrolysis of a related oxazolinium bromide. They noted that the cleavage of the ring occurred at the C—N linkage and resulted in a benzoic acid ester rather than a benzamide.

A compound of the type of Formula III may be prepared by the chlorination of a compound of Formula VI to give a 2-phenyl-4,4-dialkyl-5-chloro-5-dichloromethyl-oxazoline hydrochloride, which upon hydrolysis gives an N-(1,1-dialkyl - 3,3 - dichloroacetonyl) benzamide (Formula III). The following equation depicts this:

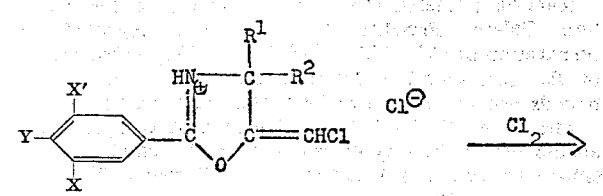

(VI)

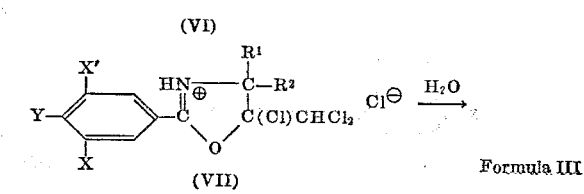

(VII)

The chlorination of a compound of Formula VI is preferably run in a solvent. Solvents of the class of chlorinated hydrocarbons, such as carbon tetrachloride, ethers and esters are suitable. Chlorine is the preferred chlorinating agent although other chlorinating agents well known in the art may be used. Excesses of the chlorinating agent up to two times the calculated amount may be used. The reaction temperature may be in the range of −50° to 250° C., preferably 0°–100° C.

The hydrolysis of a compound of Formula VII to give a compound of Formula III is carried out in the same manner as described above for the hydrolysis of a compound of Formula VI.

A compound of Formula IV may be produced by the chlorination of a compound of Formula II or III. The chlorination is preferably run in a solvent such as a chlorinated hydrocarbon, e.g. carbon tetrachloride, an ether or an ester. The reaction temperature may be in the range of −50° to 250° C., preferably 0° to 100° C. A catalyst such as ultraviolet light, ferric chloride or benzoyl peroxide may be used to facilitate the reaction.

An alternate method for the preparation of the compounds of Formula I is by the chlorination of the parent N-(1,1-dialkyl-3-acetonyl) nuclear-substituted benzamide. The following equation depicts this:

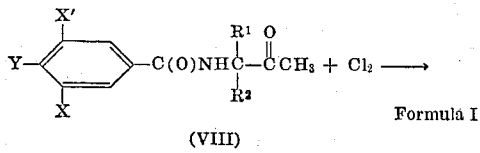

(VIII)　　　　Formula I

The same chlorinating conditions as given above for the chlorination of a compound of Formula II or III may be used. Mixtures of compounds of Formula II, III or IV may result. This method is best suited for the preparation of a compound of Formula IV since this avoids a separation of a mixture.

The benzamide structures of compounds of Formulas II, III and IV were confirmed by their i.r. and/or n.m.r. spectra.

Specific illustrative preparations of Examples 8, 13, 14 and 15 are set forth below.

Example 8.—Preparation of N-(1,1-dimethyl-3-chloroacetonyl)-3,5-dichlorobenzamide (a) Preparation of 2-(3,5-dichlorophenyl) - 4,4 - dimethyl-5-chloromethylene - oxazoline hydrochloride.—A stream of chlorine was rapidly passed into a solution of N-(1,1-dimethylpropynyl)-3,5-dichlorobenzamide (200 g., 0.782 mole) in ethyl acetate (600 ml.) at 60° C., with stirring until the theoretical amount (55.4 g., 0.78 mole) was absorbed as measured by an in-line flow meter. During the addition a solid separated and after cooling was filtered off and dried to give 254.4 g. of solid melting at 154°–157° C. This was a quantitative yield of 2-(3,5-dichlorophenyl)-4,4-dimethyl - 5 - chloromethylene-oxazoline hydrochloride.

(b) Preparation of N-(1,1-dimethyl-3-chloroacetonyl)-3,5-dichlorobenzamide.—2-(3,5 - dichlorophenyl)-4,4-dimethyl-5-chloromethyleneoxazoline hydrochloride (245 g., 0.75 mole) was heated on a steam bath for 25 minutes in a mixture of ethanol (1750 ml.), water (500 ml.), and a solution of concentrated hydrochloric acid (30 ml.) in water (100 ml.). More water (500 ml.) was then added and the solution set aside to cool. Needles separated and were filtered off to give 153.5 g. of solid melting at 161° C. After recrystallization from aqueous methanol, it melted at 161° to 163° C. The product was a 63% yield of N-(1,1-dimethyl-3-chloroacetonyl)-3,5-dichlorobenzamide.

Example 13.—Preparation of N-(1,1-dimethyl-3,3-dichloroacetonyl)-3,5-dichloro-benzamide (a) Preparation of 2 - (3,5 - dichlorophenyl)-4,4-dimethyl-5-chloro - 5 - dichloromethyl-oxazoline hydrochloride and its free base.—Excess chlorine was passed into a solution of N-(1,1-dimethylpropynyl)-3,5-dichlorobenzamide (25.6 g., 0.1 mole) in carbon tetrachloride (250 ml.) heated under reflux. On cooling, crystals separated and were filtered off to give 34 g. of solid. This was an 85% yield of 2-(3,5-dichlorophenyl)-4,4-dimethyl-5-chloro-5-dichloromethyl - oxazoline hydrochloride.

A small sample of this oxazoline hydrochloride was treated in ether with aqueous sodium carbonate to give the free base. The product was recrystallized from hexane to give a solid melting at 94°–95° C. It was found to contain by analysis 40.5% C, 2.6% H, 48.7% Cl, 3.8% N and 5.1% O; calculated for $C_{12}H_{11}Cl_5NO$ is 39.0% C, 2.8% H, 49.0% Cl, 3.9% N and 4.4% O. The product is 2-(3,5-dichlorophenyl)-4,4-dimethyl - 5 - chloro-5-dichloromethyl-oxazoline.

(b) Preparation of N-(1,1-dimethyl - 3,3 - dichloroacetonyl)-3,5-dichlorobenzamide.—2 - (3,5 - dichlorophenyl)-4,4-dimethyl-5-chloro - 5 - dichloromethyl-oxazoline hydrochloride (106 g., 0.266 mole) was heated under reflux in ethanol (1500 ml.) in the presence of concentrated hydrochloric acid (10 ml.) and water (65 ml.) for 30 minutes. The mixture was then diluted with water (350 ml.) and allowed to cool. A solid separated and was filtered off giving 65 g. of solid melting at 155° to 157° C. This was a 64% yield of N-(1,1-dimethyl-3,3-dichloroacetonyl)-3,5-dichlorobenzamide.

Example 14.—Preparation of N-(1,1-dimethyl-3,3,3-trichloroacetonyl)-3,5-dichlorobenzamide Chlorine was passed into a mixture of 70% N-(1,1-dimethyl-3,3-dichloroacetonyl)-3,5-dichlorobenzamide and 30% N-(1,1-dimethyl - 3 - chloroacetonyl)-3,5-dichlorobenzamide (52.5 g.) in carbon tetrachloride (525 ml.) at 55° C., while the solution was irradiated with an ultraviolet lamp. After the theoretical quantity of chlorine had been absorbed, the solution was allowed to cool and crystals separated and were filtered off to give 25 g. of solid melting at 137.5° to 140° C. Recrystallization from benzene gave 14.5 g. melting at 144° to 144.5° C. The product was a 42% yield of N-(1,1-dimethyl-3,3,3-trichloroacetonyl)-3,5-dichlorobenzamide.

Example 15.—Preparation of N-(1,1-diethyl-3-chloroacetonyl)-3,5-dichlorobenzamide (a) Preparation of N-(1,1-diethylpropynyl)-3,5-dichlorobenzamide.—An ether solution of 3,5-dichlorobenzoyl chloride (47 g., 0.225 mole) was allowed to react with 25 g. (0.225 mole) of 3-ethyl-3-aminopent-1-yne (available by the method of Hennion and Teach, J. Am. Chem. Soc. 75, 1653 (1953), boiling point 114° to 118° C.) in the presence of 18 g. (0.225 mole) of 50% aqueous sodium hydroxide solution. The isolated product was recrystallized from benzene/hexane to give 42.5 g. of white solid melting at 98° to 100° C. It was found by analysis to contain 59.5% C, 5.3% H, 4.9% N, 5.8% O and 24.6% Cl; calculated for $C_{14}H_{15}Cl_2NO$ is 59.2% C, 5.3% H, 4.9% N, 5.6% O and 24.9% Cl. The product is a 69% yield of N-(1,1-diethylpropynyl)-3,5-dichlorobenzamide.

(b) Preparation of 2-(3,5-dichlorophenyl)-4,4-diethyl-5-chloromethylene-oxazoline.—A stream of chlorine was rapidly passed into a solution of N-(1,1-diethylpropynyl)-3,5-dichlorobenzamide (14.2 g., 0.05 mole) in 300 ml. of diethyl ether until the theoretical amount (3.6 g., 0.05 mole) was absorbed as measured by an in-line flow meter. After stirring a further 15 minutes the solvent was removed and the residue was purified by extraction into pentane. Removal of the solvent gave 16.9 g. of white oil, whose infrared spectrum was consistent with an oxazoline base. The product is a quantitative yield of 2-(3,5-dichlorophenyl)-4,4-diethyl-5-chloromethylene-oxazoline.

(c) Preparation of N-(1,1-diethyl-3-chloroacetonyl)-3,5-dichlorobenzamide.—2-(3,5-dichlorophenyl) - 4,4 - diethyl-5-chloromethylene-oxazoline (12 g., 0.0375 mole)

was heated under reflux overnight in a mixture of 100 cc. of ethanol, 40 ml. of water and 2 cc. of concentrated hydrochloric acid. Water (200 ml.) was then added and the gummy precipitate was washed free of starting material with pentane to give 3.5 g. of solid melting at 172.5° to 176° C. The product was a 28% yield of N-(1,1-diethyl-3-chloroacetonyl)-3,5-dichlorobenzamide.

PREPARATIONS S AND T

Preparation of 2-(3,5-dichlorophenyl)-4,4-dimethyl-5-bromomethylene-ozaxoline hydrobromide and its free base (a) Preparation of 2-(3,5-dichlorophenyl)-4,4-dimethyl-5-bromomethylene-ozaxoline hydrobromide.—N - (1,1-dimethylpropynyl)-3,5-dichlorobenzamide (20 g., 0.078 mole) was dissolved in boiling carbon tetrachloride (250 ml.). A solution of bromine (12.6 g., 0.08 mole) in carbon tetrachloride (100 ml.) was added dropwise at reflux in 15 minutes. The mixture was cooled and filtered. The residue was dried overnight in a vacuum desiccator to give 19 g. of solid melting with decomposition at 215–230° C. The product was identified as 2-(3,5-dichlorophenyl)-4,4-dimethyl-5-bromomethylene-oxazoline hydrobromide.

(b) Preparation of 2-(3,5-dichlorophenyl)-4,4-dimethyl-5-bromomethylene-oxazoline.—A suspension of 2-(3,5-dichlorophenyl)-4,4-dimethyl-5-bromomethylene - oxazoline hydrobromide (10 g., 0.024 mole) was suspended in ether (100 ml.) and triethylamine (3.3 g.) was added. The mixture was stirred magnetically for 15 minutes. The suspension was filtered and the filtrate was stripped to give a solid which after recrystallization from hexane was 7 g. melting at 118.5–120° C. Infrared examination confirmed this to be 2-(3,5-dichlorophenyl)-4,4-dimethyl-5-bromomethylene-oxazoline.

Tables I and II give the identity and physical characteristics of typical oxazolines and their hydrohalide salts of the formula

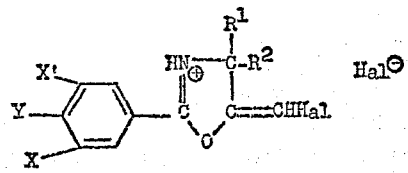

wherein $R^1$, $R^2$, X, X' and Y have the meanings given above for Formula I and Hal stands for bromo or chloro. In Table II the preparation identities are those given in Table I and the analytical figures in parentheses are those calculated from the empirical formula.

Tables III, IV and V give the identity and physical characteristics of typical examples of the benzamides of this invention.

TABLE I

Oxazoline hydrohalides (or their free bases) of the formula

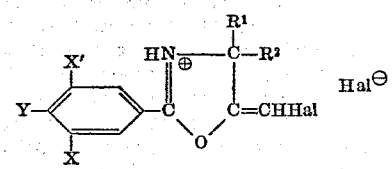

| Preparation | X | X' | Y | Hal | $R^1$ | $R_2$ | Melting point (° C.) |
|---|---|---|---|---|---|---|---|
| A[a] | Br | H | H | Cl | $CH_3$ | $CH_3$ | 165–168 |
| B | Cl | H | H | Cl | $CH_3$ | $CH_3$ | 124–140 |
| C[b] | F | H | H | Cl | $CH_3$ | $CH_3$ | 157–159 |
| D | $CH_3$ | H | H | Cl | $CH_3$ | $CH_3$ | 158–159 |
| E | $CF_3$ | H | H | Cl | $CH_3$ | $CH_3$ | 126–129 |
| F[c,d] | $C_2H_5$ | H | H | Cl | $CH_3$ | $CH_3$ | (e) |
| G | Br | Br | H | Cl | $CH_3$ | $CH_3$ | 140–148 |
| H | Cl | Cl | H | Cl | $CH_3$ | $CH_3$ | 154–157 |
| I[d] | Cl | Cl | H | Cl | $CH_3$ | $CH_3$ | 119–121 |
| J | Cl | F | H | Cl | $CH_3$ | $CH_3$ | 158–159 |
| K | $CH_3$ | $CH_3$ | H | Cl | $CH_3$ | $CH_3$ | 175–177 |
| L[d] | Cl | Cl | H | Cl | $C_2H_5$ | $C_2H_5$ | Oil |
| M | Cl | H | Cl | Cl | $CH_3$ | $CH_3$ | 151–155 |
| N | Cl | H | F | Cl | $CH_3$ | $CH_3$ | 151–153 |
| S | Cl | Cl | H | Br | $CH_3$ | $CH_3$ | 215–230 |
| T[d] | Cl | Cl | H | Br | $CH_3$ | $CH_3$ | 118–120 |

[a] Melting point of N-(1,1-dimethylpropynyl)-3-bromobenzamide is 122° to 123° C.
[b] Melting point of N-(1,1-dimethylpropynyl)-3-fluorobenzamide is 135.5° to 136.5° C.
[c] N-(1,1-dimethylpropynyl)-3-ethylbenzamide is an oily solid.
[d] Free base.
[e] Gummy solid.

TABLE II
[Analytical data on oxazoline bases and hydrohalides]

| Preparation | Empirical formula | Percent C | H | N | O | Halogen |
|---|---|---|---|---|---|---|
| A | $C_{12}H_{11}BrClNO \cdot HCl$ | 43.0 (42.8) | 3.5 (3.6) | 4.1 (4.2) | 5.0 (4.8) | Cl, 20.7 (21.0); Br, 24.1 (23.7) |
| B | $C_{12}H_{11}Cl_2NO \cdot HCl$ | 49.1 (49.8) | 4.5 (4.2) | 4.8 (4.8) | 8.4 (5.5) | Cl, 34.8 (35.7) |
| C | $C_{12}H_{11}ClFNO \cdot HCl$ | 52.3 (52.3) | 4.3 (4.4) | 5.1 (5.1) | ---- | Cl, 25.6 (25.7); F, 6.6 (6.9) |
| D | $C_{13}H_{14}ClNO \cdot HCl$ | 57.1 (57.4) | 5.7 (5.6) | 5.1 (5.1) | 6.3 (5.9) | Cl, 26.6 (26.1) |
| E | $C_{13}H_{11}ClF_3NO \cdot HCl$ | 45.7 (47.9) | 3.8 (3.7) | 4.0 (4.3) | ---- | Cl, 20.6 (21.7) |
| F | $C_{14}H_{16}ClNO$ | 51.1 (52.4) | 5.4 (5.0) | 3.9 (4.3) | 7.5 (5.0) | Cl, 32.1 (33.1) |
| G | $C_{12}H_{10}Br_2NO \cdot HCl$ | 37.4 (34.6) | 2.6 (2.7) | 3.5 (3.4) | 5.4 (3.9) | Br, 37.6 (38.4) |
| H | $C_{12}H_{10}Cl_3NO \cdot HCl$ | 45.9 (44.0) | 3.4 (3.4) | 4.5 (4.3) | 4.6 (4.9) | Cl, 39.4 (43.4) |
| I | $C_{12}H_{10}Cl_3NO$ | 49.5 (49.6) | 3.6 (3.5) | 4.6 (4.8) | 5.8 (5.5) | Cl, 36.2 (36.6) |
| J | $C_{12}H_{10}Cl_2FNO \cdot HCl$ | 46.2 (46.4) | 3.8 (3.6) | 4.5 (4.5) | ---- | Cl, 33.9 (34.2); F, 5.9 (6.1) |
| K | $C_{14}H_{18}ClNO \cdot HCl$ | 58.5 (58.7) | 6.1 (6.0) | 4.8 (4.9) | 6.0 (5.6) | Cl, 24.5 (24.8) |
| L | $C_{14}H_{14}Cl_3NO$ | 52.5 (52.8) | 4.6 (4.4) | 4.2 (4.4) | 4.9 (5.0) | Cl, 33.6 (33.4) |
| M | $C_{12}H_{10}Cl_3NO \cdot HCl$ | 44.9 (44.1) | 3.4 (3.4) | 4.3 (4.3) | 5.2 (4.9) | Cl, 42.6 (43.4) |
| N | $C_{12}H_{10}Cl_2FNO \cdot HCl$ | 46.4 (46.4) | 4.0 (3.6) | 4.3 (4.5) | ---- | Cl, 33.3 (34.2); F, 5.8 (6.1) |
| S | $C_{12}H_{10}BrCl_2NO \cdot HBr$ | 34.6 (34.6) | 2.9 (2.7) | 3.5 (3.4) | 4.6 (3.9) | Br 37.4 (38.4); Cl, 16.5 (17.0) |
| T | $C_{12}H_{10}BrCl_2NO$ | 43.3 (43.0) | 3.1 (3.0) | 4.2 (4.2) | ---- | Br, 23.7 (23.8); Cl 20.3 (21.1) |

TABLE III
Compounds of the formula

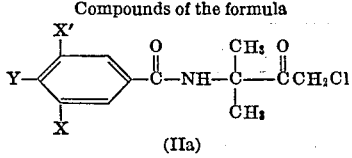

(IIa)

| Example | X | X' | Y | Melting point (° C.) |
|---|---|---|---|---|
| 1 | Br | H | H | 141-142 |
| 2 | Cl | H | H | 127-128.5 |
| 3 | F | H | H | 146-147 |
| 4 | $CH_3$ | H | H | 131-132.5 |
| 5 | $CF_3$ | H | H | 135-136.5 |
| 6 | $C_2H_5$ | H | H | 103-111 |
| 7 | Br | Br | H | 170-173.5 |
| 8 | Cl | Cl | H | 161-163 |
| 9 | Cl | F | H | 117-118.5 |
| 10 | $CH_3$ | $CH_3$ | H | 161-162 |
| 11 | Cl | H | Cl | 167.5-168.5 |
| 12 | Cl | H | F | 162-163 |

TABLE IV
Compounds of the formula

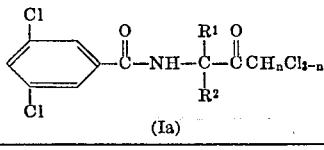

(Ia)

| Example | $R^1$ | $R_2$ | n | Melting point (° C.) |
|---|---|---|---|---|
| 13 | $CH_3$ | $CH_3$ | 1 | 155-157 |
| 14 | $CH_3$ | $CH_3$ | 0 | 144-144.5 |
| 15 | $C_2H_5$ | $C_2H_5$ | 2 | 172.5-176.5 |

The compounds of this invention were evaluated in a standard greenhouse test known as a preliminary herbicidal evaluation. For these tests seeds of selected crops and weeds were planted in soil in pots. For preemergence tests, these pots were treated immediately with the test compound. For postemergence tests, the seeds were allowed to germinate and the plants to grow for two weeks at which time they were treated by foliar application with the test chemical. In both types of test the rate of application was 10 pounds per acre (11 kilos per hectare). Four types of monocotyledonous plants were used and these were wild oat (*Avena fatua*), millet (*Setaria italica*), ryegrass (*Lolium perenne*) and sorghum (*Sorghum vulgare*). Four types of dicotyledonous plants were used and these were curly dock (*Rumex crispus*), velvetleaf (*Abutilon Theophrasti*), flax (*Linum usitatissimum*) and tomato (*Lycopersicon esculentum*). About two weeks after application of the test compounds, the state of growth and the phytotoxic effects were evaluated. Table VI gives the results.

Table VI demonstrates the good herbicidal activity of compounds of Formula I. In similar tests compounds of Formula VIII, the unchlorinated precursors, were found to have low herbicidal activity.

Similar preemergence and postemergence greenhouse tests were then run in a secondary type herbicidal test using a lower rate of application and more plant species

TABLE V
Analytical data [a] on benzamides of the structure

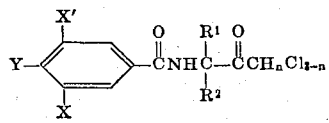

| Example | Empirical formula | C | H | N | O | Halogen |
|---|---|---|---|---|---|---|
| 1 | $C_{12}H_{13}BrClNO_2$ | 45.4 (45.2) | 4.1 (4.1) | 4.3 (4.4) | 10.5 (10.0) | Cl, 11.1 (11.1); Br, 25.1 (25.1) |
| 2 | $C_{12}H_{13}Cl_2NO_2$ | 52.9 (52.6) | 5.1 (4.8) | 5.0 (5.1) | 12.0 (11.7) | Cl, 26.0 (25.9) |
| 3 | $C_{12}H_{13}ClFNO_2$ | 55.8 (55.9) | 5.2 (5.1) | 5.3 (5.4) | | Cl, 13.6 (13.8); F, 7.3 (7.4) |
| 4 | $C_{13}H_{16}ClNO_2$ | 62.3 (61.5) | 6.6 (6.4) | 5.4 (5.5) | 13.0 (12.6) | Cl, 13.1 (14.0) |
| 5 | $C_{13}H_{13}ClF_3NO_2$ | 50.7 (50.8) | 4.2 (4.3) | 4.5 (4.5) | | Cl, 11.3 (11.5); F, 18.3 (18.5) |
| 6 | $C_{14}H_{18}ClNO_2$ | 59.4 (62.8) | 6.8 (6.8) | 4.7 (5.2) | 12.6 (12.0) | Cl 12.0 (13.2) |
| 7 | $C_{12}H_{12}Br_2ClNO_2$ | 37.3 (36.3) | 3.2 (3.0) | 3.5 (3.5) | 8.6 (8.0) | Cl, 9.3 (8.9); Br, 37.9 (40.2) |
| 8 | $C_{12}H_{12}Cl_3NO_2$ | 46.7 (46.6) | 4.0 (4.2) | 4.5 (4.5) | 10.5 (10.4) | Cl, 34.3 (34.4) |
| 9 | $C_{12}H_{12}Cl_2FNO_2$ | 49.3 (49.3) | 4.4 (4.1) | 4.7 (4.8) | | Cl, 24.1 (24.3); F, 6.4 (6.5) |
| 10 | $C_{14}H_{18}ClNO_3$ | 63.1 (63.0) | 6.5 (6.4) | 5.1 (5.2) | 12.2 (12.0) | Cl, 13.1 (13.3) |
| 11 | $C_{12}H_{12}Cl_3NO_2$ | 46.8 (47.2) | 4.2 (4.0) | 4.4 (4.6) | 10.6 (10.5) | Cl, 34.0 (33.8) |
| 12 | $C_{12}H_{12}Cl_2FNO_2$ | 49.3 (49.3) | 4.1 (4.1) | 4.7 (4.8) | | Cl, 24.1 (24.3); F, 6.6 (6.5) |
| 13 | $C_{12}H_{11}Cl_4NO_2$ | 42.3 (42.0) | 3.4 (3.2) | 4.0 (4.1) | 9.5 (9.3) | Cl, 41.1 (41.3) |
| 14 | $C_{12}H_{10}Cl_5NO_2$ | 38.1 (38.2) | 2.9 (2.7) | 3.6 (3.7) | 8.9 (8.5) | Cl, 47.0 (47.0) |
| 15 | $C_{14}H_{16}Cl_3NO_2$ | 49.4 (50.4) | 5.0 (4.8) | 3.9 (4.2) | 9.8 (9.6) | Cl, 31.6 (31.0) |

[a] Figures in parentheses are those calculated from the empirical formula.

TABLE VI
[Preliminary herbicidal evaluations (10 lbs./A.)]

| Example | Wild oat | Millet | Ryegrass | Sorghum | Curly dock | Velvet leaf | Flax | Tomato |
|---|---|---|---|---|---|---|---|---|
| | | | Percent kill (preemergence tests) | | | | | |
| 1 | 40 | 100 | 90 | 90 | 100 | 100 | 100 | 90 |
| 2 | 70 | 95 | 100 | 90 | 95 | 80 | 100 | 80 |
| 3 | 50 | 100 | 100 | 100 | 100 | 100 | 100 | 90 |
| 4 | 60 | 90 | 100 | 100 | 80 | 80 | 100 | 70 |
| 5 | 70 | 70 | 100 | 100 | 100 | 80 | 100 | 80 |
| 6 | 50 | 90 | 100 | 70 | 90 | 70 | 100 | 60 |
| 7 | 80 | 90 | 90 | 80 | 90 | 50 | 100 | 70 |
| 8 | 80 | 100 | 100 | 100 | 100 | 80 | 99 | 90 |
| 9 | 90 | 90 | 100 | 100 | 90 | 100 | 100 | 90 |
| 10 | 100 | 100 | 100 | 100 | 100 | 80 | 100 | 90 |
| 11 | 20 | 0 | 80 | 80 | 100 | 100 | 90 | 40 |
| 12 | 40 | 95 | 100 | 100 | 100 | 70 | 100 | 70 |
| 13 | 80 | 90 | 99 | 100 | 100 | 60 | 99 | 70 |
| 14 | 70 | 70 | 80 | 70 | 70 | 80 | 50 | 50 |
| 15 | 30 | 0 | 80 | 30 | 60 | 0 | 20 | 30 |

TABLE VI.—Continued

| Example | Wild oat | Millet | Ryegrass | Sorghum | Curly dock | Velvet leaf | Flax | Tomato |
|---|---|---|---|---|---|---|---|---|
| Percent kill (postemergence tests) | | | | | | | | |
| 1 | 20 | 80 | 50 | 40 | 80 | 100 | 30 | 100 |
| 2 | 20 | 60 | 30 | 50 | 60 | 100 | 50 | 70 |
| 3 | 20 | 50 | 60 | 60 | 100 | 20 | 50 | 70 |
| 4 | 20 | 90 | 50 | 30 | 100 | 40 | 80 | 80 |
| 5 | 10 | 80 | 60 | 20 | 90 | 60 | 90 | 80 |
| 6 | 20 | 0 | 0 | 0 | 90 | 50 | 20 | 90 |
| 7 | 20 | 90 | 50 | 0 | 100 | 40 | 100 | 80 |
| 8 | 40 | 60 | 70 | 60 | 30 | 60 | 100 | 100 |
| 9 | 30 | 90 | 60 | 50 | 100 | 40 | 90 | 90 |
| 10 | 0 | 60 | 50 | 30 | 0 | 40 | 30 | 20 |
| 11 | 0 | 60 | 0 | 30 | 100 | 100 | 60 | 100 |
| 12 | 20 | 40 | 20 | 50 | 60 | 70 | 40 | 100 |
| 13 | 50 | 80 | 20 | 10 | 50 | 60 | 40 | 70 |
| 14 | 0 | 0 | 0 | 0 | 0 | 20 | 0 | 50 |
| 15 | 0 | 0 | 0 | 0 | 90 | 70 | 30 | 80 | planted in flats. For this test the amount of toxicant was Table VII gives the results.

TABLE VII
[Secondary herbicidal evaluation (4 lbs./a.)]

| Example | A' | B' | C' | D' | E' | F' | G' | H' | I' | J' | K' | L' | M' | N' | O' | P' | Q' | R' | S' | T' |
|---|---|---|---|---|---|---|---|---|---|---|---|---|---|---|---|---|---|---|---|---|
| Percent kill of plant species—preemergence tests | | | | | | | | | | | | | | | | | | | | |
| 1 | 100 | 90 | 0 | 60 | 0 | 60 | 90 | 0 | 0 | 70 | 40 | 90 | 80 | 40 | 90 | 0 | 0 | 0 | 0 | 0 |
| 2 | 100 | 100 | 0 | 100 | 20 | 80 | 80 | 30 | 0 | 50 | 60 | 100 | 0 | 80 | 100 | 0 | 20 | 0 | 70 | 0 |
| 3 | 100 | 100 | 0 | 70 | 20 | 90 | 90 | 80 | 0 | 90 | 0 | 90 | 80 | 50 | 100 | 0 | | 0 | 60 | 0 |
| 4 | 90 | 90 | 0 | 90 | 30 | 80 | 80 | 0 | 0 | 80 | 0 | 100 | 90 | 30 | 100 | 0 | 40 | 30 | 0 | 20 |
| 5 | 90 | 90 | 0 | 80 | 20 | 70 | 90 | 90 | 30 | 70 | 70 | 90 | 70 | 0 | 90 | 0 | 0 | 0 | 60 | 0 |
| 7 | 80 | 80 | 0 | 0 | 10 | 40 | 80 | 0 | 0 | 0 | 0 | 0 | 90 | 0 | 100 | 0 | 0 | 60 | 0 | 0 |
| 8 | 80 | 90 | 0 | 0 | 20 | 60 | 80 | 0 | 10 | 20 | 40 | 50 | 50 | 0 | 90 | 0 | 20 | 40 | 20 | 0 |
| 9 | 90 | 100 | 0 | 80 | 20 | 90 | 90 | 80 | 20 | 70 | 50 | 100 | 100 | 30 | 100 | 0 | 40 | 40 | 70 | 0 |
| 10 | 90 | 90 | 0 | 50 | 20 | 80 | 90 | 0 | 0 | 0 | 80 | 90 | 50 | 0 | 100 | 0 | 0 | 0 | 20 | 0 |
| 11 | 30 | 0 | 0 | 40 | 0 | 20 | 0 | 0 | 0 | 0 | 0 | 0 | 0 | 0 | 0 | 0 | 0 | 20 | 0 | 0 |
| 12 | 90 | 90 | 0 | 80 | 10 | 80 | 90 | 80 | 10 | 20 | 0 | 100 | 60 | 10 | 50 | 20 | 40 | 40 | 80 | 0 |
| 13 | 0 | 0 | 0 | 0 | 0 | 0 | 0 | 0 | 0 | 0 | 0 | 30 | 50 | 0 | 0 | 0 | 70 | 90 | 10 | 0 |
| 14 | 60 | 70 | 0 | 0 | 0 | 30 | 80 | 0 | 0 | 0 | 0 | 90 | 0 | 100 | 80 | 0 | 0 | 0 | 0 | 50 |
| 15 | 20 | 0 | 0 | 0 | 0 | 0 | 30 | 0 | 0 | 0 | 0 | 0 | 30 | 0 | 0 | 0 | 0 | 0 | 80 | 0 |
| Postemergence tests | | | | | | | | | | | | | | | | | | | | |
| 1 | 50 | 20 | 0 | 30 | 0 | 20 | 20 | 0 | 0 | 50 | 0 | 100 | 50 | 0 | 20 | 0 | 0 | 0 | 0 | 30 |
| 2 | 50 | 0 | 0 | 0 | 0 | 20 | 0 | 0 | 0 | 20 | | 90 | 70 | 40 | 90 | 0 | 20 | 0 | 0 | 0 |
| 3 | 20 | 0 | 0 | 50 | 0 | 0 | 30 | 0 | 0 | 30 | 0 | 40 | 0 | 30 | 20 | 0 | 30 | 0 | 10 | 10 |
| 4 | 40 | 10 | 20 | 0 | 10 | 20 | 10 | 0 | 10 | 20 | | 80 | 50 | 30 | 80 | 0 | 0 | 0 | 0 | 0 |
| 5 | 70 | 0 | 20 | 0 | 20 | 0 | 0 | 0 | 0 | 20 | | 90 | 90 | 30 | 90 | 0 | 0 | 0 | 0 | 0 |
| 7 | 0 | 0 | 20 | 10 | 30 | 20 | 10 | 0 | 0 | 20 | | 90 | 70 | 30 | 90 | 0 | 40 | 0 | 0 | 0 |
| 8 | 40 | 0 | 30 | 0 | 10 | 20 | 10 | 40 | 0 | 30 | | 90 | 70 | 30 | 90 | 0 | 30 | 0 | 20 | 0 |
| 9 | 50 | 10 | 40 | 20 | 10 | 10 | 40 | 0 | 0 | 20 | | 80 | 90 | 70 | 80 | 0 | 30 | 0 | 0 | 0 |
| 10 | 40 | 10 | 0 | 0 | 0 | 0 | 0 | 0 | 0 | 0 | | 0 | 0 | 0 | 90 | 0 | 0 | 0 | 0 | 0 |
| 11 | 0 | 20 | 0 | 0 | 0 | 0 | 0 | 10 | 0 | 0 | 0 | 50 | 90 | 0 | 40 | 0 | 20 | 0 | 0 | 0 |
| 12 | 50 | 30 | 0 | 40 | 0 | 20 | 0 | 20 | 20 | 20 | 70 | 50 | 0 | 20 | 70 | 0 | 50 | 0 | 0 | 30 |
| 13 | 50 | 0 | 0 | 0 | 30 | 0 | 0 | 0 | 0 | 20 | 0 | 50 | 50 | 0 | 50 | 0 | | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 20 | 0 | 0 | 0 | 20 | 0 | 10 | 20 | 0 | 0 | 50 | 0 | 20 | 10 | 0 | 20 | 0 | 10 |

4 pounds per acre (4.4 kilos per hectare). The plant species used were

Monocotyledonous plant:     Botanical name
- A' crabgrass — Digitaria sanguinalis.
- B' millet — Setaria italica.
- C' wheat — Triticum aestivum.
- D' ryegrass — Lolium perenne.
- E' wild oat — Avena fatua.
- F' Sudan grass — Sorghum sudanensis.
- G' barnyard grass — Echinochloa crusgalli.
- H' rice — Oryza sativa.
- I' corn — Zea mays.

Dicotyledonous plant:
- J' mustard — Brassic kaber.
- K' wild carrot — Daucus carota.
- L' lambsquarters — Chenopodium album.
- M' curly dock — Rumex crispus.
- N' velvetleaf — Abutilon Theophrasti.
- O' pigweed — Amaranthus retroflexus.
- P' soybean — Glycine max.
- Q' flax — Linum usitassimum.
- R' alfalfa — Medicago sativa.
- S' tomato — Lycopersicon esculentum.
- T' cotton — Gossypium hirsutum.

From Table VII it is noted that good selective herbicidal action is obtained and particularly tolerant crops include corn (I'), cotton (T'), rice (H'), soybean (P') and wheat (C').

A preemergence type test similar to the above was run except that the test compound was incorporated into the soil, fewer plant species were used and two new species were added. These were U' foxtail—Setaria glauca
V' jute—Corchorus capsularis This method could be important in special application, such as where furrow irrigation is practiced.

In carrying out this test the seeds were planted in soil in flats, covered with a piece of cheesecloth and then with about three-fourths inch of soil. The flat was then sprayed with the compound at a rate of 4 lbs. per acre. The compound was then incorporated into the upper three-fourths inch of soil by lifting up the cheesecloth and mixing the soil in it. The impregnated soil was then replaced over the seed and the evaluation continued as for a regular preemergence test. Table VIII gives the results.

TABLE VIII

[Herbicidal evaluations by soil incorporation]

| Example | _____ Percent kill of plant species _____ | | | | | | | | | | | | | | | | |
|---|---|---|---|---|---|---|---|---|---|---|---|---|---|---|---|---|---|
| | B' | C' | D' | E' | F' | G' | H' | I' | U' | K' | M' | N' | P' | Q' | R' | T' | V' |
| 1 | 80 | 0 | 95 | 0 | 90 | 100 | 40 | 0 | 100 | 50 | 100 | 100 | 0 | 70 | 0 | 0 | ---- |
| 2 | 100 | 20 | 100 | 20 | 80 | 80 | 90 | 10 | 100 | 60 | 100 | 50 | 0 | 80 | 0 | 0 | 80 |
| 3 | 100 | 20 | 100 | 0 | 95 | 80 | 20 | 50 | 100 | 30 | 100 | 50 | 0 | 80 | 0 | 0 | ---- |
| 4 | 100 | 0 | 100 | 20 | 90 | 70 | 30 | 0 | 90 | 0 | 100 | 0 | 0 | 90 | 80 | 0 | 90 |
| 5 | 100 | 10 | 100 | 20 | 80 | 90 | 70 | 20 | 100 | 100 | 100 | 30 | 0 | 60 | 0 | 0 | 100 |
| 6 | 0 | 0 | 70 | 20 | 70 | 40 | 0 | 30 | 70 | 20 | 100 | 0 | 0 | 0 | 30 | 0 | 30 |
| 7 | 90 | 0 | 100 | 20 | 70 | 90 | 40 | 20 | 100 | 80 | 100 | 20 | 0 | 90 | 90 | 0 | 90 |
| 8 | 100 | 10 | 100 | 20 | 90 | 100 | 90 | 30 | 90 | 90 | 100 | 0 | 0 | 80 | 70 | 0 | 100 |
| 9 | 100 | 20 | 100 | 20 | 100 | 100 | 90 | 30 | 100 | 90 | 100 | 20 | 0 | 80 | 70 | 0 | 90 |
| 10 | 100 | 10 | 100 | 20 | 100 | 100 | 80 | 0 | 100 | 0 | 100 | 0 | 0 | 90 | 70 | 0 | 80 |
| 11 | 20 | 20 | 80 | 0 | 30 | 100 | 0 | 0 | ---- | 0 | 100 | 0 | 0 | 60 | 60 | 0 | 100 |
| 12 | 90 | 30 | 90 | 20 | 90 | 100 | 60 | 30 | ---- | 50 | 100 | 50 | 0 | 60 | 50 | 90 | 100 |
| 13 | 100 | 0 | 100 | 90 | 90 | 99 | 20 | 0 | 100 | 0 | 100 | 0 | 50 | 90 | 50 | 0 | 0 |
| 14 | 60 | 0 | 100 | 0 | 20 | 40 | 0 | 0 | 90 | 50 | ---- | 50 | 0 | 70 | ---- | 0 | 10 |
| 15 | 0 | 0 | 100 | 20 | 50 | 60 | 0 | 0 | 70 | 100 | 100 | 0 | 20 | 90 | 30 | 0 | 40 |

In field tests, the compound of Example 8 has given good control of ragweed (Ambrosia spp.), giant foxtail (Setaria faberi) and wild lettuce (Lactuca spp.). Such crops as corn, cotton, soybean, tomato, cucumber (Cucumis sativa) and peanuts (Arachnis hypogaea) have shown tolerance to it.

Herbicidal activity has been noted for the intermediate oxazoline hydrochlorides (Formula VI) and their free bases. Typical results are given in Table IX for Preparations B, H and I of Table I at 4 pounds per acre by the soil incorporation procedure described above. The plant species designations are the same as those given above as used in Tables VII and VIII. Two additional plant species used in this test were W' Johnsongrass—*Sorghum halepense*
X' peas—*Pisum sativum* sodium sulfates, calcium alkylbenzenesulfonates and sodium dialkyl sulfosuccinates. Representative of the cationics are (higher alkyl) dimethylbenzylammonium chlorides. Representative of the nonionics are condensation products of alkylene oxides with fatty alcohols, alkyl phenols, mercaptans, amines or fatty acids, such as dinonylphenoxypolyethoxyethanol in which there are 8 to 100 ether groupings and similar polyethoxy compounds prepared with other hydrophilic groupings, including esters of long chain fatty acids and mannitan or sorbitan, which are reacted with ethylene oxide.

The following compositions are typical of emulsifiable concentrate formulations when solvents are used.

```
                                            Parts/100 parts total
N-(1,1-dialkyl-3-chloroacetonyl) benzamide ___ 10 to 35
Solvent _____ 55 to 88
Emulsifying agent _____ 2 to 10
```

TABLE IX

[Herbicidal evaluations by soil incorporation]

| Preparation | _____ Percent kill of plant species _____ | | | | | | | | | | | | | | | | | |
|---|---|---|---|---|---|---|---|---|---|---|---|---|---|---|---|---|---|---|
| | B' | C' | D' | E' | F' | G' | H' | I' | K' | M' | N' | O' | P' | Q' | R' | S' | T' | U' | W' | X' |
| A | 60 | 0 | 70 | 0 | 0 | 70 | 0 | 0 | 0 | 100 | 100 | ---- | 0 | 0 | 0 | 0 | 100 | ---- | ---- | 0 |
| B | 50 | 0 | 100 | 20 | 70 | 90 | 30 | 20 | 0 | 100 | 20 | ---- | 0 | 0 | 0 | 0 | 100 | 0 | 90 | 0 |
| C | 50 | 0 | 90 | 0 | 40 | 80 | 0 | 0 | 0 | 100 | 0 | ---- | 0 | 20 | 0 | 0 | 70 | ---- | ---- | 0 |
| D | 90 | 0 | 70 | 10 | 50 | 60 | 20 | 0 | 0 | 100 | 0 | 100 | 0 | 40 | 0 | 0 | 60 | 50 | 40 | 0 |
| E | 100 | 10 | 80 | 20 | 90 | 90 | 20 | 0 | 80 | ---- | 70 | ---- | 0 | 100 | 70 | 0 | 70 | 100 | 90 | 0 |
| G | 100 | 20 | 100 | 90 | 90 | 100 | 30 | 30 | 0 | ---- | 40 | ---- | 0 | 100 | 0 | 0 | 100 | 70 | 90 | 0 |
| H | 95 | 20 | 100 | 99 | 30 | 100 | 0 | 0 | 100 | 100 | 0 | 100 | 40 | 50 | 0 | 0 | 99 | 0 | 90 | 0 |
| I | 95 | 20 | 95 | 0 | 60 | 100 | 40 | 0 | 100 | 100 | 0 | 100 | 0 | 90 | 0 | 0 | 100 | 0 | 60 | 0 |
| J | 90 | 10 | 0 | 40 | 100 | 100 | 90 | 0 | 50 | ---- | 90 | ---- | 0 | 90 | 60 | 0 | 100 | 90 | 80 | 0 |
| K | 99 | 20 | 99 | 30 | 60 | 99 | 20 | 0 | 0 | 100 | 0 | 100 | 0 | 90 | 0 | 0 | 100 | 0 | 80 | 0 |
| L | 50 | 0 | 0 | 0 | 50 | 30 | 20 | 0 | 90 | 0 | 0 | ---- | 0 | 0 | 0 | 0 | 0 | 90 | 80 | 0 |
| M | 0 | 0 | 0 | 0 | 0 | 0 | 0 | 0 | 0 | 0 | 0 | 0 | 0 | 0 | 0 | 0 | 0 | 0 | 0 | 0 |
| N | 80 | 0 | 60 | 0 | 80 | 0 | 80 | 0 | 0 | ---- | 100 | ---- | 0 | 90 | 0 | 0 | 100 | 90 | 80 | 0 |
| T | 0 | 0 | 0 | 0 | 0 | 0 | 0 | 0 | 0 | 50 | 0 | 0 | 0 | 30 | 0 | 0 | 0 | 0 | 0 | 0 |

The compositions of this invention comprise an N-(1,1-dialkyl-3-chloroacetonyl)-3-(or -3,4-, -3,5- or -3,4,5-) substituted benzamide together with an agronomically acceptable carrier. By "an agronomically acceptable carrier" is meant any substance which can be used to dissolve, disperse, or diffuse the chemical within it, without impairing the effectiveness of the toxic agent, which is not permanently deleterious to the soil in any chemical or physical manner and which is usually nonphytocidal to the agricultural crops to be protected. The compositions may be in the form of solutions, emulsifiable concentrates, wettable powders, granules or dusts. One or more liquid or solid carriers may be used for a particular herbicidal composition.

An emulsifiable concentrate is made by dissolving an N-(1,1-dialkyl-3-chloroacetonyl) benzamide in a solvent to which one or more surfactants are added. Suitable solvents or liquid carriers for use in preparing these emulsifiable concentrates may, for example, be found in the hydrocarbon and ketone classes of organic solvents such as xylene, acetone, isophorone, mesityl oxide, cyclohexanone and mixtures of these. Preferred solvents are ketone-hydrocarbon mixtures such as isophorone-xylene. The emulsifying agents used are surfactants of the anionic, cationic, or non-ionic types and mixtures thereof. Representative of the anionic surfactants are fatty alcohol Wettable powder formulations comprise an N-(1,1-dialkyl-3-chloroacetonyl) benzamide admixed in a solid carrier along with a surface active agent(s) which gives this type of formulation its wettability, dispersibility and spreading characteristics. Solid carriers which are suitable for preparing these wettable powder formulations are those which have been rendered agronomically suitable by pulverizing devices and may be organic or inorganic in nature. Suitable organic carriers are soybean, walnut or wood flower or tobacco dust; and suitable inorganic ones are clays of the montmorillonite (bentonite), kaolinite or fuller's earth types; silicas such as diatomaceous earth and hydrated silica; silicates such as talc, pyrophyllite, or alkaline earth silicates, and calcium and magnesium carbonates. A surfactant or mixture of surfactants is added to the wettable powder formulation. Suitable dispersing agents are sodium lignin sulfonate, sodium formaldehyde-naphthalene sulfonate, or sodium N-methyl-N-higher alkyl taurates. Wetting agents useful for this purpose include higher alkylaryl sulfonates such as calcium dodecylbenzenesulfonate, long-chained alcohol sulfates, sodium alkylphenoxypolyethoxyethyl sulfonates, sodium dioctyl sulfosuccinate, and ethylene oxide adducts with fatty alcohols or with higher alkylphenols, such as octylphenoxypolyethoxyethanol in which there are 8 to 80 ether groupings and similar polyethoxy compounds made from stearyl alcohol. Operative spreading or adhesive agents include glycerol mannitan laurate or a condensate of polyglycerol and oleic acid modified with phthalic anhydride. Additionally, many of the surfactants discussed above function as spreading and adhesive agents. The active ingredient content of the wettable powders may be in the range of about 20% to 80%, however, the preferred range of concentration is 50% to 75%.

The following compositions are typical for wettable powder formulations:

|  | Parts/100 parts total |
|---|---|
| N-(1,1-dialkyl-3-chloroacetonyl) benzamide | 20 to 80 |
| Carrier | 10 to 79 |
| Surfactants | 1 to 10 |

Dust concentrates are made by incorporating an N-(1,1-dialkyl-3-chloroacetonyl) benzamide of this invention into a solid carrier such as finely powdered clays, talc, silica and synthetic silicates, alkaline earth carbonates and diluents of natural origin, such as tobacco dust or walnut shell flour. Granular formulations are made from similar type solid carriers except that the particle size is larger, in the range of 15 to 60 mesh. A small amount of dispersing agent may be incorporated into these solid formulations. The concentration of active ingredients in these dust or granular formulations may be in the range of 0.5 to 15%.

It will be seen from the above that the compositions of this invention may contain 20% to 99.5% of carrier based on the total weight of the composition, depending on whether it is in the form of a solution, an emulsifiable concentrate, a wettable powder, a dust or a granular formulation.

A particularly convenient method for making solid formulations is to dissolve the active ingredient in a volatile solvent, such as acetone, apply this solution to the solid carrier with thorough mixing, and then remove the solvent by allowing it to evaporate at either normal or reduced pressure.

Generally for use as herbicides the active ingredient is applied at the rate of about 0.5 to 10 or more pounds per acre (0.55 to 11 kilos per hectare) with 1 to 4 pounds per acre (1.1 to 4.4 kilos per hectare) preferred.

Representative compounds of Formula I have demonstrated good fungicidal activity for the control of fungi in the class of Phycomycetes. The class of Phycomycetes includes such genera as Phytophthora, Plasmopora, Peronospora and Pseudoperonospora. These compounds have not shown a high degree of fungicidal activity against the classes of fungi known as Fungi Imperfecti and Ascomycetes.

Tests involving the control of late blight, *Phytophthora infestans*, of potato and tomato were run as described below. Succulent 6–8 inch high (4–5 week old) potato plants and 3–4 inch high tomato plants were used. The plants were sprayed with a 1200 p.p.m. solution of the test compound in a solvent system consisting of acetone:methanol:water at 25:25:50 by hand spraying to just wet the foliage with a minimum of run-off. The plants were then allowed to dry and placed in a greenhouse for 2–3 days. The plants were then subjected to simulated rain by overhead spraying with a garden hose equipped with a Fogg-it nozzle placed about 3 feet above the plants so that approximately 1 inch of rain was delivered in about 2.5 minutes onto the foliage as a fine spray. The plants were then inoculated with a spore suspension of *Phytophthora infestans* containing 30,000–40,000 spores per cc. The plants were then placed in a 100% humidity chamber at 60° F. for about 36 hours then moved to a 70° F. growing room for 1–2 days. The percent disease that had developed in comparison with untreated controls was then read by means of lesion counts. Table X gives the results with representative compounds of this invention.

TABLE X
[Control of *Phytophthora infestans*]

| Example | Percent disease on— | |
|---|---|---|
|  | Potato | Tomato |
| 1 | 2 | 12 |
| 2 | 7 | 87 |
| 3 | 22 | 72 |
| 4 | 12 | 62 |
| 5 | 5 | 35 |
| 7 | 0 | 10 |
| 8 | 0 | 2 |
| 9 | 0 | 11 |
| 10 | 5 | 1 |
| 11 | 2 | 12 |
| 12 | 2 | 0 |
| 13 | 0 | 5 |
| 14 | 2 | 0 |
| 15 | 100 |  |

Representative compounds of Formula I were found to control the grape downy mildew organism, *Plasmopora viticola*. In this test 6–8 inch high Seibel grape seedlings were sprayed to run-off using a series of dosages of spray mixtures containing 1200 p.p.m., 300 p.p.m. and 75 p.p.m. of the test compound. Three replicates for each dosage were used and untreated plants were employed as controls. The plants were held for 24 hours and were then inoculated with a spore suspension of *Plasmopora viticola* containing about 75,000 spores per cc. The plants were then held for 1 week under controlled temperature and humidity conditions until the downy mildew disease developed. The percent control was then observed. Table XI gives the results.

TABLE XI
[Control of *Plasmopara viticola*]

| Example | Percent control at— | | |
|---|---|---|---|
|  | 1,200 p.p.m. | 300 p.p.m. | 75 p.p.m. |
| 1 | 100 | 100 | 100 |
| 2 | 100 | 100 | 92 |
| 3 | 100 | 100 | 100 |
| 4 | 100 | 98 | 84 |
| 5 | 100 | 100 | 98 |
| 7 | 100 | 100 | 100 |
| 8 | 100 | 100 | 100 |
| 9 | 100 | 100 | 100 |
| 10 | 100 | 100 | 66 |
| 11 | 100 | 100 | 100 |
| 12 | 100 | 100 | 100 |
| 14 | 100 | 100 | 100 |

Representative compounds of Formula I were evaluated for the control of downy mildew on broccoli caused by *Peronospora parasitica*. In this test, the test compound was dissolved in a 50:50 acetone-methanol solution and diluted with water to give concentrations of 1200 p.p.m., 300 p.p.m. and 150 p.p.m. of the compound. Each concentration of each compound was then sprayed to run-off onto three 4–5 inch high broccoli seedlings and the plants allowed to dry. The treated plants were then weathered in a humidity cabinet overnight and again allowed to dry. The plants were then inoculated with a suspension of *Peronospora parasitica* spores containing about 10,000 spores per cc. The plants were then held for 6 days to allow the disease lesions to develop and the amount of disease determined based on an index rating of 0–4 where 0=no infection and 4=severe infection. Table XII gives the results.

TABLE XII
[Control of *Peronospora parasitica*]

| Example | Index rating at— | | |
|---|---|---|---|
|  | 1,200 p.p.m. | 300 p.p.m. | 150 p.p.m. |
| 2 | 0 | 0.7 | 0.7 |
| 5 | 0.7 | 4.0 | 4.0 |
| 7 | 0.7 | 0 | 0.3 |
| 8 | 0 | 0.3 | 1.0 |
| 9 | 0.3 | 2.0 | 1.0 |
| 14 | 0.7 | 0.7 | 1.0 |

In field tests, the compounds of Examples 8 and 14 controlled downy mildew of cucumbers caused by *Pseudoperonospora cubensis.*

In tests on Alternaria, Cercospora, Helminthosporium, Piricularia and Verticillium genera of fungi, representative compounds of Formula I were low in activity.

Typical oxazoline hydrochlorides of the type of Formula VI have been demonstrated to have fungicidal activity. A test on late blight, *Phytophthora infestans,* of tomato was conducted similarly to that described above for the data in Table X except subjecting the plants to simulated rain was omitted. The amount of disease control was recorded by the following rating system.

| Rating: | Percent disease control |
|---|---|
| A | 90–100 |
| B | 70–90 |
| C+ | Less than 70 |
| C | No control |

Table XIII gives the results for typical preparations of compounds of Formula VI and their free bases at two dosage rates.

TABLE XIII

[Control of *Phytophthora infestans*]

| | Rating at— | |
|---|---|---|
| Preparation a | 1,200 p.p.m. | 150 p.p.m. |
| B | A | A |
| D | B | C |
| E | A | A |
| G | A | A |
| J | A | A– |
| M | A– | B |
| N | A– | B+ | a See Table I.

Oxazoline salts conforming to the structure

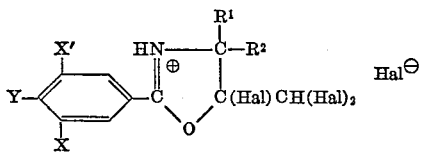

wherein $R^1$, $R^2$, X, X' and Y have the meanings given above for Formula I and Hal is bromine or chlorine or a mixture thereof and their free bases have also demonstrated excellent fungicidal activity.

A compound of Formula IX where Hal is bromine may be made by a bromination sequence of compounds in which $Cl_2$ in the equations given above is replaced by $Br_2$. The following equations depict this.

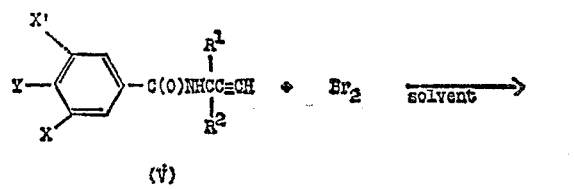

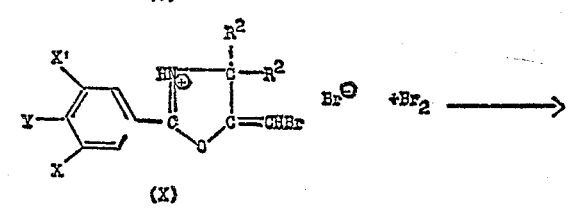

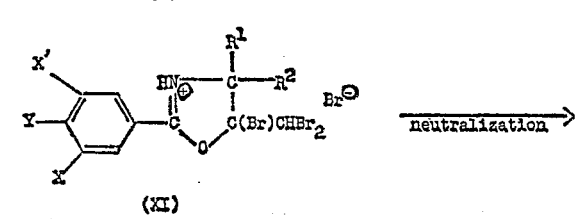

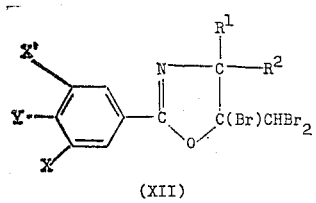

The reaction conditions for the bromination are the same as for the chlorination.

Typical structures corresponding to Formula IX are

Preparation:
- O — 2-(3,5-dichlorophenyl)-4,4-dimethyl-5-chloro-5-dichloromethyl-oxazoline hydrochloride (see Example 13a above).
- P — 2-(3,5-dichlorophenyl)-4,4-dimethyl-5-chloro-5-dichloromethyl-oxazoline) see Example 13a above).
- Q — 2-(3,5-dichlorophenyl)-4,4-dimethyl-5-bromo-5-dibromomethyl-oxazoline hydrobromide. This is a solid melting at 210° C. (with decomposition). It was found to contain by analysis: 25.0% C, 1.9% H, 54.5% Br, 11.9% Cl, 2.5% N and 3.5% O; calculated for $C_{12}H_{10}Br_3Cl_2NO \cdot HBr$ is 24.6% C, 1.9% H, 54.6% Br, 12.1% Cl, 2.4% N and 2.7% O.
- R — 2-(3,5-dichlorophenyl)-4,4-dimethyl-5-bromo-5-dibromoethyl-oxazoline. This is a solid melting at 120–125° C. (with decomposition). It was found to contain by analysis: 29.4% C, 2.0% H, 46.9% Br, 14.1% Cl, 2.9% N and 3.9% O; calculated for $C_{12}H_{10}Br_3Cl_2NO$ is 29.1% C, 2.0% H, 48.4% Br, 14.3% Cl, 2.8% N and 3.2% O.

Table XIV gives the fungicidal results for typical compounds of Formula IX and their free bases when evaluated on *Phytophthora infestans* by the technique described for Table XIII and on *Plasmopora viticola* by the technique described for Table XI.

TABLE XIV

[Fungicidal activity]

| Preparation | Rating vs. *P. infestans* at 150 p.p.m. | Percent control of *P. viticola* at 300 p.p.m. |
|---|---|---|
| O | A | 100 |
| P | A | 100 |
| Q | A | 100 |
| R | A | 100 |

In persistency-type tests wherein the treated plants were weathered by means of rain before inoculation Preparation Q gave excellent results for the control of *Phytophthora infestans* and Preparation R gave excellent results for the control of *Plasmopora viticola.*

For use as fungicides the N-(1,1-dialkyl-3-chloroacetonyl)benzamides and the oxazoline structures of Formulas VI and IX are usually formulated. Emulsifiable concentrates, flowable emulsion concentrates and wettable powders are typical formulations. They may also be dissolved in water-miscible solvents to give solutions which may be easily extended with water. Dilute sprays of the compounds may be applied at concentrations of 0.05 to 10 pounds (0.023 to 4.5 kilos) per 100 gallons (378 liters) of spray and preferably at 0.1 to 2 pounds (0.045 to 0.9 kilo) per 100 gallons of spray. In more concentrated sprays, the active ingredient is increased by a factor of 2 to 12. With dilute sprays, applications are usually made to the plants until run-off is achieved, whereas with more concentrated sprays the materials are applied as mists. For practical purposes, the compounds of this invention should be used as foliar fungicides only on crops which are tolerant to an amount which is fungicidally effective.

When a chemical preparation results in a mixture of products, such as when the chlorination of a compound of Formula VIII gives more than one product, the mixture may be used as such without separation of the individual components.

The compounds of this invention may be utilized as the sole biocidal agent or they may be employed in conjunction wtih other biocidal agents such as bactericides, fungicides, herbicides, insecticides, miticides and comparable pesticides.

Other herbicides which can be incorporated to provide additional advantages and effectiveness include:

Carboxylic acids and derivatives 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
2-methyl-3,6-dichlorobenzoic acid and its salts
2,3-dichloro-6-methylbenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
4-(2,4-dichlorophenoxy)butyric acid and its salts and esters
4-(2-methyl-4-chlorophenoxy)butyric acid and its salts and esters
2,3,6-trichlorophenylacetic acid and its salts
3,6-endoxohexahydrophthalic acid
dimethyl 2,3,5,6-tetrachloroterephthalate
trichloroacetic acid and its salts
2,2-dichloropropionic acid and its salts
2,3-dichloroisobutyric acid and its salts

Carbamic acid derivatives ethyl N,N-di(n-propyl)thiolcarbamate
propyl N,N-di(n-propyl)thiolcarbamate
ethyl N-ethyl-N-(n-butyl)thiolcarbamate
propyl N-ethyl-N-(n-butyl)thiolcarbamate
2-chloroallyl N,N-diethyldithiocarbamate
N-methyldithio-carbamic acid salts
ethyl 1-hexamethyleneiminecarbothiolate
isopropyl N-phenylcarbamate
isopropyl N-(m-chlorophenyl)carbamate
4-chloro-2-butynyl N-(m-chlorophenyl)carbamate
methyl N-(3,4-dichlorophenyl)carbamate

Phenols dinitro-o-(sec.-butyl)phenol and its salts
pentachlorophenol and its salts

Substituted ureas 3-(3,4-dichlorophenyl)-1,1-dimethylurea
3-(4-chlorophenyl)1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
dichloral urea

Substituted triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-chloro-4-ethylamino-6-(3-methoxypropylamino)-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-chloro-4,6-bis(isopropylamino)-s-triazine
2-methoxy-4,6-bis(ethylamino)-s-triazine
2-methoxy-4-ethylamino-6-isopropylamino-s-triazine
2-methylmercapto-4-(2-methoxyethylamino)-6-isopropylamino-s-triazine

Diphenyl ether derivatives 2,4-dichloro-4'-nitrodiphenyl ether
2,4,6-trichloro-4'-nitrodiphenyl ether
2,4-dichloro-6-fluoro-4'-nitrodiphenyl ether
3-methyl-4'-nitrodiphenyl ether
3,5-dimethyl-4'-nitrodiphenyl ether
2,4'-dinitro-4-trifluoromethyldiphenyl ether

Anilides

N-(3,4-dichlorophenyl)propionamide
N-(3,4-dichlorophenyl)methacrylamide
N-(3-chloro-4-methylphenyl)-2-methylpentanamide
N-(3,4-dichlorophenyl)trimethylacetamide
N-(3,4-dichlorophenyl)-α,α-dimethylvaleramide

Uracils 5-bromo-3-s-butyl-6-methyluracil
5-bromo-3-cyclohexyl-1,6-dimethyluracil
3-cyclohexyl-5,6-trimethyleneuracil
5-bromo-3-isopropyl-6-methyluracil
3-tert-butyl-5-chloro-6-methyluracil

Nitriles 2-6-dichlorobenzonitrile
diphenylacetonitrile
3,5-dibromo-4-hydroxybenzonitrile
3,5-diiodo-4-hydroxybenzonitrile

Other organic herbicides 2-chloro-N,N-diallylacetamide
N-(1,1-dimethyl-2-propynyl)-3,5-dichlorobenzamide
maleic hydrazide
3-amino-1,2,4-triazole
monosodium methanearsonate
disodium methanearsonate
N,N-dimethyl-α,α-diphenylacetamide
N,N-di-(n-propyl)-2,6-dinitro-4-trifluoromethylaniline
N,N-di-(n-propyl)-2,6-dinitro-4-methylaniline
N,N-di(n-propyl)-2,6-dinitro-4-methylsulfonylaniline
O-(2,4-dichlorophenyl)-O-methyl-isopropylphosphoramimidothioate
4-amino-3,5,6-trichloropicolinic acid
2,3-dichloro-1,4-naphthoquinone
di(methoxythiocarbonyl)disulfide
6,7-dihydrodipyrido[1,2-a:2',1'-c]pyrazidinium salts
1,1'-dimethyl-4,4'-bipyridinium salts
3,4,5,6-tetrahydro-3,5-dimethyl-2-thio-2H-1,3,5-thiadiazine Other fungicides which may be combined with the compounds of this invention include dithiocarbamates and derivatives such as ferric dimethyldithiocarbamate (ferbam), zinc dimethyldithiocarbamate (ziram), manganese ethylenebisdithiocarbamate (maneb) and its coordination product with zinc ion, zinc ethylenebisdithiocarbamate (zinez), tetramethylthiuram disulfide (thiram) and 3,5-dimethyl-1,3,5,2H-tetrahydrothiadiazine-2-thione; nitrophenol derivatives such as dinitro-(1-methylheptyl)phenyl crotonate (dinocap), 2-sec-butyl-4,6-dinitrophenyl 3,3-dimethylacrylate (binapacryl) and 2-sec-butyl-4,6-dinitrophenyl isopropyl carbonate; heterocyclic structures such as N-trichloromethylthio-tetrahydrophthalimide (captan), N-trichloromethylthiopalimide (folpet), 2-heptadecyl-2-imidazoline (glyodin), 2,4-dichloro-6-(o-chloroanilo)-s-triazine, diethyl phthalimidophosphorothioate, 5-amino-1-[bis(dimethylamino)phosphinyl]-3-phenyl-1,2,4-triazole, 2,3-dicyano-1,4-dithia-anthraquinone (dithianon), 2-thio-1,3-dithio[4,5-b]quinoxaline (thioquinox), 1-(butylcarbamoyl)-2-benzimidazole carbamic acid methyl ester (benomyl), 4-(2-chlorophenylhydrazono)-3-methyl-5-isoxazolone and bis(p-chlorophenyl)-3-pyridinemethanol; and miscellaneous fungicides such as dodecylquanidine acetate (dodine), 3-[2-(3,5-dimethyl-2-oxycyclohexyl)-2-hydroxyethyl]glutarimide (cycloheximide), phenylmercuric acetate, N-ethylmercuri-1,2,3,6-tetrahydro - 3,6-endomethano-3,4,5,6,7,7-hexachlorophthalimide, phenylmercuric monoethanolammonium lactate, 2,3-dichloro-1,4-naphthoquinone, pyridine-2-thiol-1-oxide, Bordeaux mixture and sulfur.

We claim:

1. A compound of the formula

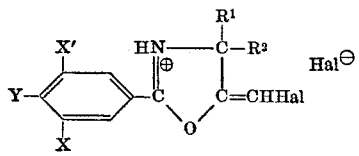

wherein
$R^1$ and $R^2$ are methyl or ethyl;
X and X' are hydrogen, bromo, chloro, fluoro, methyl, ethyl or trifluoromethyl with the proviso that only one may be hydrogen;
Y is hydrogen, bromo, chloro, fluoro or methyl; and
Hal is bromo or chloro, and the free bases thereof.

2. A compound according to claim 1 wherein Hal is chloro.

3. A compound according to claim 1 wherein Hal is bromo.

4. The compound according to claim 2 which is 2-(3,5-dichlorophenyl) - 4,4 - dimethyl-5-chloromethylene-oxazoline hydrochloride.

5. The compound according to claim 2 which is 2-(3,5-dichlorophenyl) - 4,4 - dimethyl-5-chloromethylene-oxazoline.

6. The compound according to claim 2 which is 2-(3-chlorophenyl) - 4,4-dimethyl-5-chloromethylene-oxazoline hydrochloride.

7. The compound according to claim 2 which is 2-(3-trifluoromethylphenyl) - 4,4-dimethyl-5-chloromethylene-oxazoline hydrochloride.

8. The compound according to claim 2 which is 2-(3,5-dibromophenyl) - 4,4-dimethyl-5-chloromethylene-oxazoline hydrochloride.

9. The compound according to claim 3 which is 2-(3,5-dichlorophenyl) - 4,4-dimethyl-5-bromomethylene-oxazoline hydrobromide.

10. The compound according to claim 3 which is 2 - (3,5-dichlorophenyl)-4,4-dimethyl-5-bromomethylene-oxazoline.

References Cited
UNITED STATES PATENTS
3,278,544  10/1966  Easton _____ 260—307

ALEX MAZEL, Primary Examiner
R. V. RUSH, Assistant Examiner

U.S. Cl. X.R.
71—88; 424—272